US006429430B2

(12) United States Patent
Sato et al.

(10) Patent No.: US 6,429,430 B2
(45) Date of Patent: Aug. 6, 2002

(54) SCINTILLATOR PANEL, RADIATION IMAGE SENSOR, AND METHODS OF MAKING THE SAME

(75) Inventors: Hiroto Sato; Takuya Homme; Toshio Takabayashi, all of Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 49 days.

(21) Appl. No.: 09/737,817

(22) Filed: Dec. 18, 2000

Related U.S. Application Data

(63) Continuation-in-part of application No. PCT/JP99/03267, filed on Jun. 18, 1999.

(30) Foreign Application Priority Data

Jun. 18, 1998 (JP) .......................................... 10-171189

(51) Int. Cl.[7] ................................................. G01T 1/20
(52) U.S. Cl. .............. 250/363.01; 250/367; 250/370.11
(58) Field of Search ...................... 250/363.01, 370.11, 250/370.09, 367, 483.1, 488.1

(56) References Cited

U.S. PATENT DOCUMENTS

| | | | | |
|---|---|---|---|---|
| 5,066,861 A | * | 11/1991 | Nakayama et al. | .... 250/370.09 |
| 5,132,539 A | * | 7/1992 | Kwasnick et al. | ...... 250/361 R |
| 5,153,438 A | * | 10/1992 | Kingsley et al. | ....... 250/370.09 |
| 5,179,284 A | * | 1/1993 | Kingsley et al. | ............ 250/367 |
| 5,208,460 A | * | 5/1993 | Rougeot et al. | ............ 250/366 |
| 6,278,118 B1 | * | 8/2001 | Homme et al. | ............. 250/367 |
| 6,348,693 B1 | * | 2/2002 | Weisfield et al. | ......... 250/370.1 |
| 6,353,228 B1 | * | 3/2002 | Itabashi | ................. 250/370.11 |

FOREIGN PATENT DOCUMENTS

| | | |
|---|---|---|
| JP | 62-49779 | 3/1987 |
| JP | 63-215987 | 9/1988 |
| JP | 1-172792 | 7/1989 |
| JP | 5-196742 | 8/1993 |
| JP | 5-203755 | 8/1993 |
| JP | 7-21560 | 3/1995 |
| WO | WO 99/38031 | 7/1999 |

* cited by examiner

Primary Examiner—Constantine Hannaher
Assistant Examiner—Albert Gagliardi
(74) Attorney, Agent, or Firm—Morgan, Lewis & Bockius LLP

(57) ABSTRACT

A scintillator having a columnar structure adapted to convert incident radiation into visible light is formed on one surface of a substrate made of Al in a scintillator panel. All surfaces of the substrate and scintillator are covered with a first polyparaxylylene film, whereas an $SiO_2$ film is formed on the surface of polyparaxylylene film on the scintillator side. Further, a second polyparaxylylene film is formed on the surface of $SiO_2$ film and the surface of polyparaxylylene film on the substrate side, so that all surfaces are covered with the second polyparaxylylene film.

16 Claims, 4 Drawing Sheets

SCINTILLATOR PANEL, RADIATION IMAGE SENSOR, AND METHODS OF MAKING THE SAME

RELATED APPLICATIONS

This is a Continuation-In-Part application of International Patent Application serial No. PCT/JP99/03267 filed on Jun. 18, 1999 now pending.

BACKGROUND OF THE INVENTION

1. Field of the Invention

The present invention relates to a scintillator panel and a radiation image sensor which are used for medical X-ray photography and the like, and methods of making them.

2. Related Background Art

While X-ray sensitive films have been used in medical and industrial X-ray photography, radiation imaging systems using radiation detecting devices have been coming into wider use from the viewpoint of convenience and their storability of photographed results. In such a radiation imaging system, pixel data caused by two-dimensional radiation are acquired by a radiation detecting device as an electric signal, which is then processed by a processing unit, so as to be displayed onto a monitor.

Conventionally known typical radiation detecting devices include those disclosed in Japanese Patent Application Laid-Open No. HEI 5-196742 and No. SHO 63-215987. Such a radiation detecting device forms a scintillator on an imaging device or a fiber optical plate (FOP), i.e., an optical part constituted by a plurality of optical fibers bundled together, such that the radiation incident thereon from the scintillator side is converted by the scintillator into light, so as to be detected.

Here, CsI, which is a typical scintillator material, is high in moisture absorbency and deliquesces by absorbing vapor (moisture) in the air, thereby deteriorating characteristics of the scintillator such as the resolution in particular. Therefore, a moisture-resistant barrier impermeable to water is formed on the upper side of the scintillator layer in the above-mentioned radiation detecting device, so as to protect the scintillator against the moisture.

SUMMARY OF THE INVENTION

As radiation detecting devices are in wider use, there are cases where it is desirable to use a radiation detecting device having a structure in which a scintillator is formed not on an imaging device or FOP but on a substrate having a favorable X-ray transmissivity such as a substrate made of Al, while the imaging device is disposed so as to face the scintillator.

In such a case, since X-rays are incident from the substrate side, a metal film aimed at moisture resistance cannot be formed on the surface of scintillator, and the moisture resistance has been problematic when a transparent organic film is simply formed on the surface of scintillator for the purpose of moisture resistance.

It is an object of the present invention to provide a scintillator panel and a radiation image sensor which are excellent in moisture resistance, and methods of making them.

The scintillator panel of the present invention is characterized in that it comprises a radiation-transparent substrate, a scintillator formed on the substrate, a first transparent organic film covering over the scintillator, and a transparent inorganic film formed on the first transparent organic film. According to the present invention the transparent inorganic film is formed on the first transparent organic film covering over the scintillator, the moisture resistance of scintillator can remarkably be improved by the transparent inorganic film.

The radiation image sensor of the present invention is characterized in that it comprises a radiation-transparent substrate, a scintillator formed on the substrate, a first transparent organic film covering over the scintillator, a transparent inorganic film formed on the first transparent organic film, and an imaging device disposed so as to face the scintillator. According to the present invention the transparent inorganic film is formed on the first transparent organic film covering over the scintillator, the moisture resistance of scintillator can remarkably be improved by the transparent inorganic film.

The method of making the scintillator panel of the present invention is characterized in that it comprises steps of forming a scintillator on a radiation-transparent substrate, forming a first transparent organic film covering over the scintillator, and forming a transparent inorganic film on the first transparent organic film. Since the transparent inorganic film is formed on the first transparent organic film, the present invention can make a scintillator panel in which the moisture resistance of scintillator is remarkably improved.

The method of making an image sensor according to the present invention is characterized in that it comprises steps of forming a scintillator on a radiation-transparent substrate, forming a first transparent organic film covering over the scintillator, forming a transparent inorganic film on the first transparent organic film, and disposing an imaging device opposite the scintillator. Since the transparent inorganic film is formed on the first transparent organic film, the present invention can make a radiation image sensor in which the moisture resistance of scintillator is remarkably improved.

The scintillator panel according to the present invention may further comprise a second transparent organic film formed on the transparent inorganic film of the scintillator panel. Since the second transparent organic film is formed on the transparent inorganic film, the present invention can prevent the transparent inorganic film from peeling.

The transparent inorganic film may be formed by a material including a substance selected from the group consisting of $SiO_2$, $Al_2O_3$, $TiO_2$, $In_2O_3$, $SnO_2$, $MgO$, $SiN$, $MgF_2$, $LiF$, $CaF_2$, $AgCl$, and $SiNO$.

The first transparent organic film may cover all over the substrate for securely protecting the scintillator from moisture.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
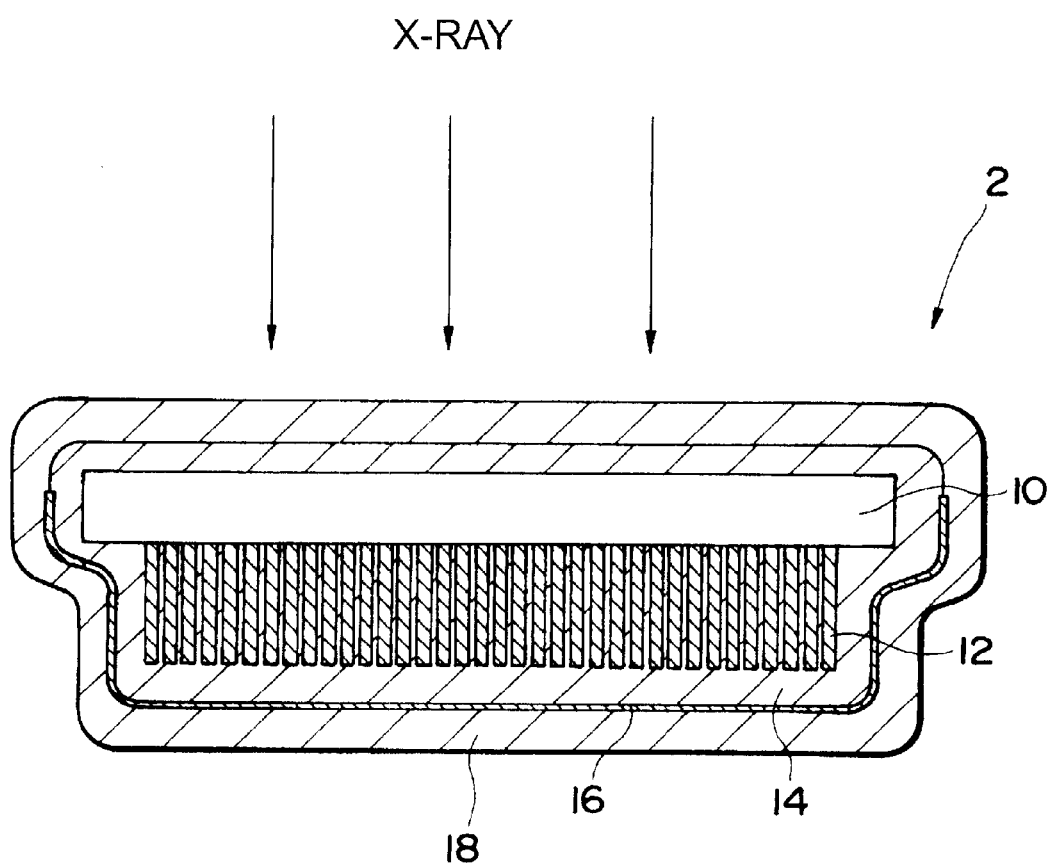
FIG. 1 is a sectional view of a scintillator panel in accordance with an embodiment of the present invention.
Figure 2:
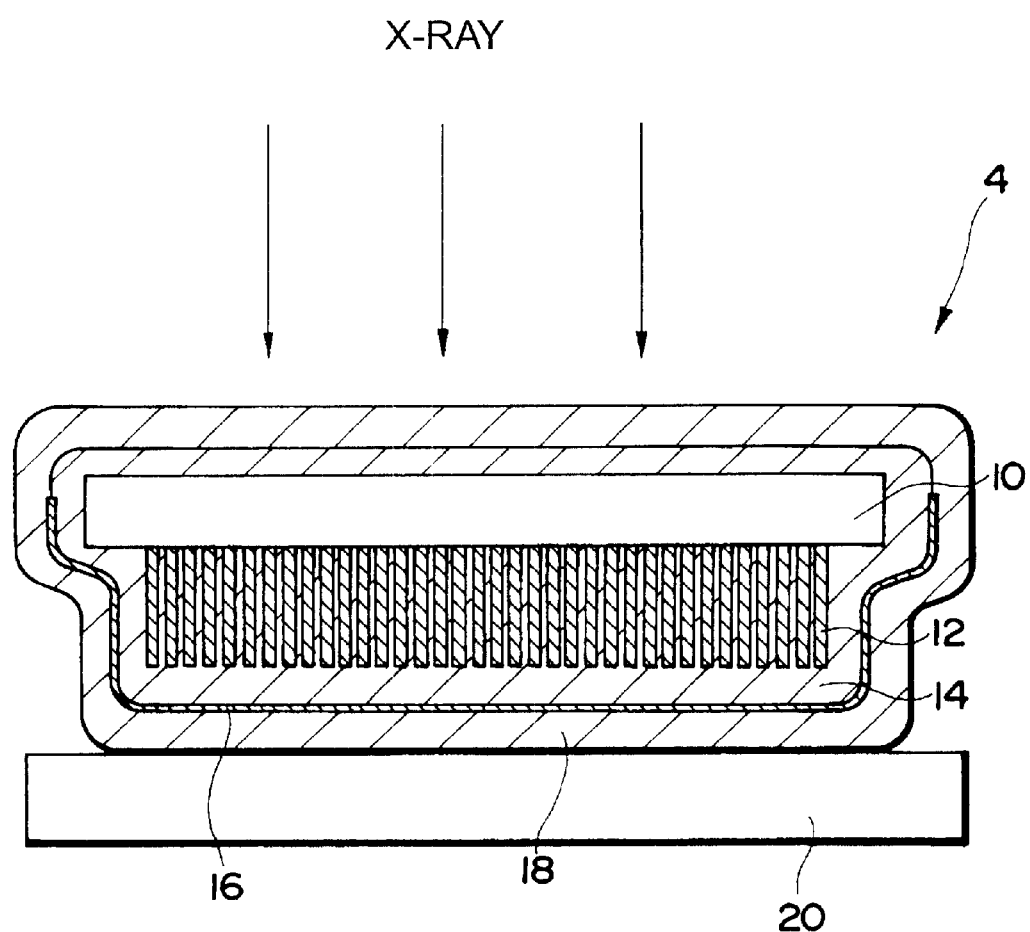
FIG. 2 is a sectional view of a radiation image sensor in accordance with an embodiment of the present invention.
Figure 3A:
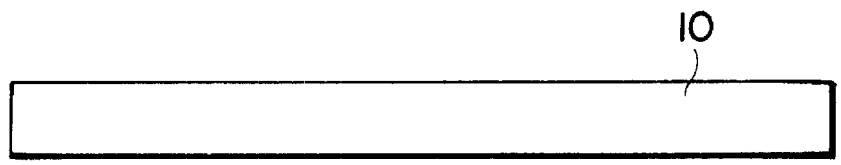
FIGS. 3A, 3B, 3C, 4A, and 4B are views showing sequential steps of making the scintillator panel in accordance with an embodiment of the present invention.
Figure 3B:
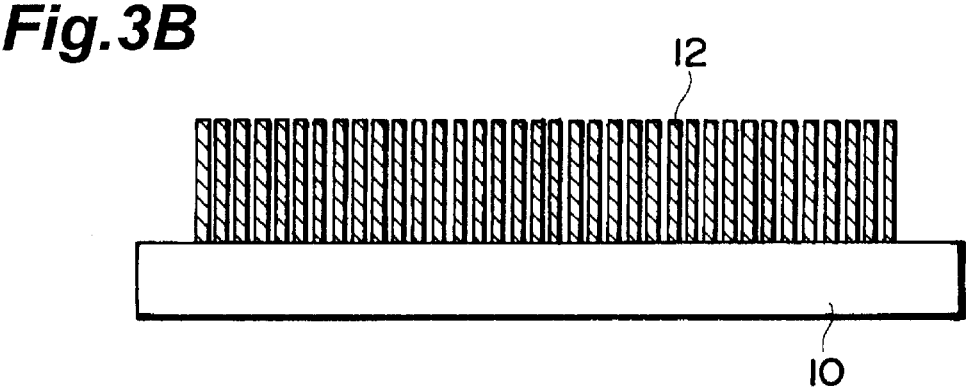
Figure 3C:
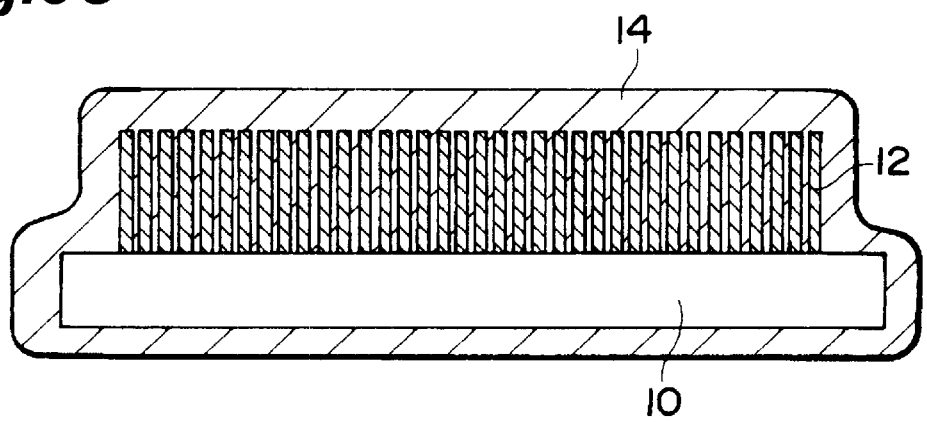

In the following, embodiments of the present invention will be explained with reference to FIGS. 1 to 4B. FIG. 1 is a sectional view of a scintillator panel 2 in accordance with an embodiment, whereas FIG. 2 is a sectional view of a radiation image sensor 4 in accordance with an embodiment.

As shown in FIG. 1, one surface of a substrate 10 made of Al in the scintillator panel 2 is formed with a scintillator 12 having a columnar structure adapted to convert incident radiation into visible light. Tl-doped CsI is used in the scintillator 12.

All surfaces of the scintillator 12 formed on the substrate 10, together with the substrate 10, are covered with a first polyparaxylylene film (first transparent organic film) 14, whereas the surface of first polyparaxylylene film 14 on the scintillator 12 side is formed with an $SiO_2$ film (transparent inorganic film) 16. Further, the surface of $SiO_2$ film 16 and the surface of first polyparaxylylene film 14 on the substrate 10 side not covered with the $SiO_2$ film 16 are formed with a second polyparaxylylene film (second transparent organic film) 18, so that all surfaces are covered with the second polyparaxylylene film 18. The radiation image sensor 4, on the other hand, has a structure in which an imaging device 20 is attached to the scintillator panel 2 on the scintillator 12 side as shown in FIG. 2.

With reference to FIGS. 3A to 4B, steps of making the scintillator panel 2 will now be explained. On one surface of the substrate 10 (having a thickness of 1.0 mm) made of Al, such as the one shown in FIG. 3A, columnar crystals of CsI doped with Tl are grown by vapor deposition method, so as to form the scintillator 12 (see FIG. 3B).

CsI forming the scintillator 12 is high in moisture absorbency so that it will deliquesce by absorbing vapor in the air if left exposed. For preventing this from occurring, the first polyparaxylylene film 14 is formed by CVD method. Namely, the substrate 10 having formed the scintillator 12 is put into a CVD apparatus, and the first polyparaxylylene film 14 is formed by a thickness of 10 µm. As a consequence, the first polyparaxylylene film 14 is formed over all surfaces of the scintillator 12 and substrate 10 (see FIG. 3C). Since the tip portion of scintillator 12 is uneven, the first polyparaxylylene film 14 also acts to flatten the tip portion of scintillator 12.

Figure 4A:
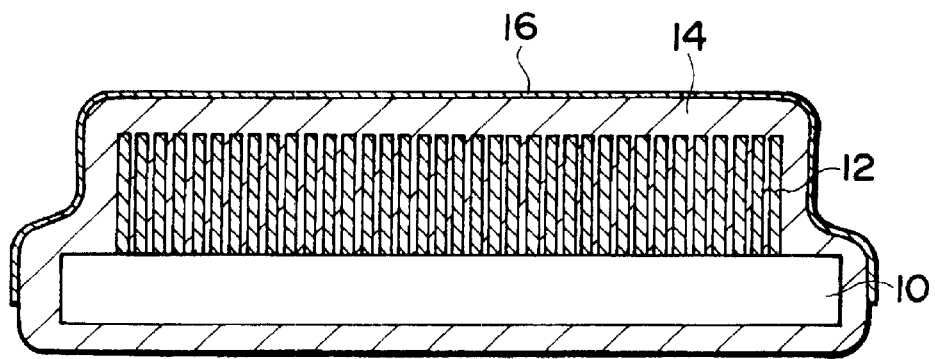

Subsequently, the $SiO_2$ film 16 is formed with a thickness of 300 nm by sputtering on the first polyparaxylylene film 14 on the scintillator 12 side (see FIG. 4A). Since the $SiO_2$ film 16 is aimed at improving the moisture resistance of scintillator 12, it is formed in an area covering over the scintillator 12. Since the tip portion of scintillator 12 is flattened by the first polyparaxylylene film 14 as mentioned above, the $SiO_2$ film 16 can be formed thinner (with a thickness of 100 nm to 200 nm) so as to prevent the output light quantity from decreasing.

Figure 4B:
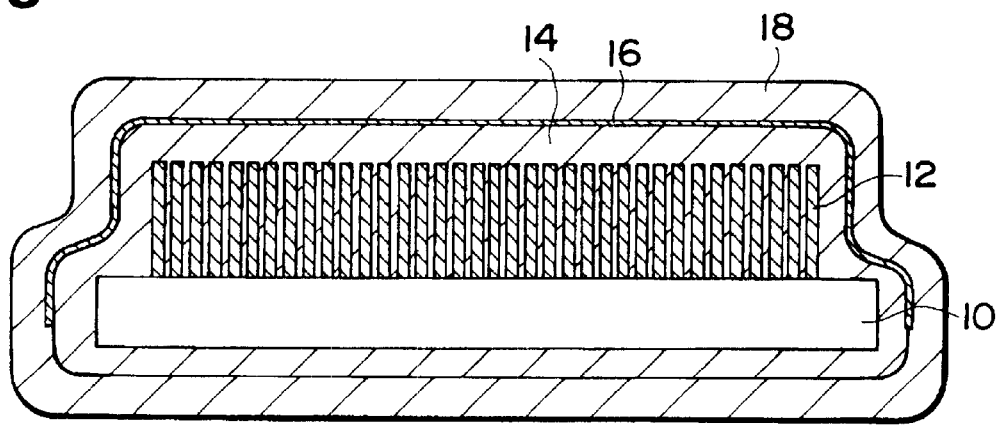

Further, on the surface of $SiO_2$ film 16 and the surface of first polyparaxylylene film 14 on the substrate 10 side not formed with the $SiO_2$ film 16, the second polyparaxylylene film 18 is formed with a thickness of 10 µm again by CVD method (see FIG. 4B). When this step is completed, the making of scintillator panel 2 ends.

The radiation image sensor 4 is made by attaching the imaging device (CCD) 20 to thus completed scintillator panel 2 on the scintillator 12 side.

Thus made scintillator panel 2 and a conventional scintillator panel, i.e., a scintillator panel having only one layer of polyparaxylylene film on a scintillator, were subjected to a moisture resistance test under a condition with a relative humidity of 93% at a temperature of 40° C.

While the conventional scintillator panel deteriorated its resolution characteristic by 10% to 15% relative to the initial value thereof when left in this environment for 100 hours, no change was observed in the resolution characteristic of the scintillator panel 2 in accordance with this embodiment even when left for 2800 hours in the above-mentioned environment. Hence, it was possible to elongate the moisture resistance life performance to 30 times that of the conventional scintillator panel by using the structure of scintillator panel 2.

As explained in the foregoing, the scintillator panel 2 in accordance with this embodiment can remarkably improve the moisture resistance of scintillator panel 2 by forming the $SiO_2$ film 16 on the first polyparaxylylene film 14 on the scintillator 12 side. Also, since the second polyparaxylylene film 18 is formed on the $SiO_2$ film 16, the latter can be prevented from peeling.

Though the $SiO_2$ film is used as a transparent inorganic film in the above-mentioned embodiment, it is not restrictive; and inorganic films made from $SiO_2$, $Al_2O_3$, $TiO_2$, $In_2O_3$, $SnO_2$, MgO, SiN, $MgF_2$, LiF, $CaF_2$, AgCl, SiNO, and the like may also be used.

Though CsI(Tl) is used as the scintillator in the above-mentioned embodiment, it is not restrictive; and CsI(Na), NaI(Tl), LiI(Eu), KI(Tl), and the like may also be used.

Though a substrate made of Al is used as the substrate in the above-mentioned embodiment, any substrate may be used as long as it has a favorable X-ray transmissivity, whereby substrates made of amorphous carbon, substrates made of C (graphite), substrates made of Be, substrates made of SiC, and the like may also be used.

Though the $SiO_2$ film 16 is formed on the surface of first polyparaxylylene film 14 on the scintillator 12 side in the above-mentioned embodiment, it may be formed not only on the surface of polyparaxylylene film 14 on the scintillator 12 side, but over all surfaces of the first polyparaxylylene 14.

While the polyparaxylylene film 18 is formed on the surface of $SiO_2$ film 16 and the surface of polyparaxylylene film 14 on the substrate 10 side, i.e., over all surfaces, in the above-mentioned embodiment, the material for polyparaxylylene film 18 is not limited as long as it is a film made of a transparent material, since it acts to prevent the $SiO_2$ film 16 from peeling, and it may be formed in an area covering over the $SiO_2$ film 16.

In the above-mentioned embodiment, polyparaxylylene encompasses not only polyparaxylylene but also polymonochloroparaxylylene, polydichloroparaxylylene, polytetrachloroparaxylylene, polyfluoroparaxylylene, polydimethylparaxylylene, polydiethylparaxylylene, and the like.

Since the scintillator panel of the present invention has a transparent inorganic film formed on the first transparent organic film covering over the scintillator, the moisture resistance of scintillator can remarkably be improved by this transparent inorganic film. Also, in the case where a second transparent organic film is formed on the transparent inorganic film, this second transparent organic film can prevent the transparent inorganic film from peeling.

Since the radiation image sensor of the present invention has a transparent inorganic film formed on the first transparent organic film covering over the scintillator, the moisture resistance of scintillator can remarkably be improved by this transparent inorganic film. Also, in the case where a second transparent organic film is formed on the transparent inorganic film, this second transparent organic film can prevent the transparent inorganic film from peeling.

Since a transparent inorganic film is formed on the first transparent organic film by the third step, the method of making a scintillator panel of the present invention can make a scintillator panel in which the moisture resistance of scintillator is remarkably improved. Also, in the case where a second transparent organic film is formed on the transparent inorganic film by the fourth step, a scintillator panel which can prevent the transparent inorganic film from peeling can be made.

Since a transparent inorganic film is formed on the first transparent organic film by the third step, the method of making a radiation image sensor of the present invention can make a radiation image sensor in which the moisture resistance of scintillator is remarkably improved. Also, in the case where a second transparent organic film is formed on the transparent inorganic film by the fourth step, a radiation image sensor in which this second transparent organic film can prevent the transparent inorganic film from peeling can be made.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A scintillator panel comprising:

a radiation-transparent substrate;

a scintillator formed on said substrate;

a first transparent organic film covering over said scintillator;

and a transparent inorganic film formed on said first transparent organic film.

2. A scintillator panel according to claim 1, further comprising a second transparent organic film formed on said transparent inorganic film.

3. A scintillator panel according to claim 1, wherein said transparent inorganic film is made of a material including a substance selected from the group consisting of $SiO_2$, $Al_2O_3$, $TiO_2$, $In_2O_3$, $SnO_2$, Mgo, SiN, $MgF_2$, LiF, $CaF_2$, AgCl, and SiNO.

4. A scintillator panel according to claim 1, wherein said first transparent organic film covers all over said substrate.

5. A radiation image sensor comprising:

a radiation-transparent substrate;

a scintillator formed on said substrate;

a first transparent organic film covering over said scintillator;

a transparent inorganic film formed on said first transparent organic film; and an imaging device disposed so as to face said scintillator.

6. A radiation image sensor according to claim 5, further comprising a second transparent organic film formed on said transparent inorganic film.

7. A radiation image sensor according to claim 5, wherein said transparent inorganic film is made of a material including a substance selected from the group consisting of $SiO_2$, $Al_2O_3$, $TiO_2$, $In_2O_3$, $SnO_2$, MgO, SiN, $MgF_2$, LiF, $CaF_2$, AgCl, and SiNO.

8. A radiation image sensor according to claim 5, wherein said first transparent organic film covers all over said substrate.

9. A method of making a scintillator panel, said method comprising step of:

forming a scintillator on a radiation-transparent substrate;

forming a first transparent organic film covering over said scintillator; and forming a transparent inorganic film on said first transparent organic film.

10. A method of making a scintillator panel according to claim 9, further comprising a step of forming a second transparent organic film on said transparent inorganic film.

11. A method of making a scintillator panel according to claim 9, wherein said transparent inorganic film is made of a material including a substance selected from the group consisting of $SiO_2$, $Al_2O_3$, $TiO_2$, $In_2O_3$, $SnO_2$, MgO, SiN, $MgF_2$, LiF, $CaF_2$, AgCl, and SiNO.

12. A method of making a scintillator panel according to claim 9, wherein said first transparent organic film covers all over said substrate.

13. A method of making a radiation image sensor comprising steps of:

forming a scintillator on a radiation-transparent substrate;

forming a first transparent organic film covering over said scintillator;

forming a transparent inorganic film on said first transparent organic film; and disposing an imaging device opposite said scintillator.

14. A method of making a radiation image sensor according to claim 13, further comprising a step of forming a second transparent organic film on said transparent inorganic film.

15. A method of making a radiation image sensor according to claim 13, wherein said transparent inorganic film is made of a material including a substance selected from the group consisting of $SiO_2$, $Al_2O_3$, $TiO_2$, $In_2O_3$, $SnO_2$, MgO, SiN, $MgF_2$, LiF, $CaF_2$, AgCl, and SiNO.

16. A method of making a scintillator panel according to claim 13, wherein said first transparent organic film covers all over said substrate.

* * * * *